United States Patent
Xu et al.

(10) Patent No.: US 10,099,940 B2
(45) Date of Patent: Oct. 16, 2018

(54) METHOD OF PRODUCING ELECTROLYTIC MANGANESE DIOXIDE WITH HIGH COMPACT DENSITY AND ELECTROLYTIC MANGANESE DIOXIDE PRODUCED THEREFROM

(71) Applicant: Erachem Comilog, Inc., Baltimore, MD (US)

(72) Inventors: Bei Xu, Glen Burnie, MD (US); Oliver Schilling, Severna Park, MD (US); Keith A. Keel, Baltimore, MD (US)

(73) Assignee: Prince Erachem Inc., Baltimore, MD (US)

( * ) Notice: Subject to any disclaimer, the term of this patent is extended or adjusted under 35 U.S.C. 154(b) by 258 days.

(21) Appl. No.: 14/690,709

(22) Filed: Apr. 20, 2015

(65) Prior Publication Data
US 2015/0298989 A1   Oct. 22, 2015

Related U.S. Application Data

(60) Provisional application No. 61/981,942, filed on Apr. 21, 2014.

(51) Int. Cl.
*C01G 45/02* (2006.01)
*B02C 23/00* (2006.01)
(Continued)

(52) U.S. Cl.
CPC .............. *C01G 45/02* (2013.01); *B02C 23/06* (2013.01); *B02C 23/36* (2013.01);
(Continued)

(58) Field of Classification Search
CPC ......... Y02E 60/12; B02C 23/06; B02C 23/36; B02C 25/00; C01F 5/02
(Continued)

(56) References Cited

U.S. PATENT DOCUMENTS

| 3,888,790 A | * | 6/1975 | Chay ........................ B01J 23/34 427/245 |
| 4,405,419 A | | 9/1983 | Misawa et al. |

(Continued)

FOREIGN PATENT DOCUMENTS

| CA | 385405 A | 12/1939 |
| CN | 102347479 A * | 2/2012 |

(Continued)

*Primary Examiner* — Hoa (Holly) Le
(74) *Attorney, Agent, or Firm* — The Webb Law Firm

(57) ABSTRACT

A method for producing electrolytic manganese dioxide with high compact density where electrolytic manganese dioxide pieces are milled in a classifying mill to produce first milled manganese dioxide particles where 30% of the particles are larger than 200 mesh and up to 95% of the particles are smaller than 325 mesh. The first milled manganese dioxide particles are milled a second time to produce manganese dioxide particles having a second particle size distribution. Also, an electrolytic manganese dioxide particle composition, wherein when the particle size distribution of the composition is plotted as a function of base-10 logarithm of the particle size, a first peak is centered at a particle size from 40-100 μm and contributes a minimum of 20% of the area under the curve of the overall particle size distribution and a maximum of 45% of the area under the curve of the overall particle size distribution.

19 Claims, 6 Drawing Sheets

(51) Int. Cl.
*B02C 23/36* (2006.01)
*B02C 23/06* (2006.01)

(52) U.S. Cl.
CPC ...... *C01P 2004/51* (2013.01); *C01P 2004/61* (2013.01); *C01P 2006/11* (2013.01)

(58) Field of Classification Search
USPC .............. 428/402, 403; 241/20, 24.1, 29
See application file for complete search history.

(56) References Cited

U.S. PATENT DOCUMENTS

| | | | | |
|---|---|---|---|---|
| 4,549,943 A | * | 10/1985 | Mellors | C25B 1/21 205/352 |
| 4,697,744 A | * | 10/1987 | Wada | C01G 49/02 209/164 |
| 5,083,712 A | * | 1/1992 | Askew | A62D 1/0014 241/16 |
| 6,630,065 B2 | * | 10/2003 | Takahashi | C01G 45/02 205/539 |
| 2002/0046955 A1 | * | 4/2002 | Takahashi | C01G 45/02 205/539 |
| 2002/0136955 A1 | * | 9/2002 | Park | C01G 45/1242 429/231.1 |
| 2005/0025699 A1 | | 2/2005 | Reed et al. | |
| 2011/0220842 A1 | | 9/2011 | Nanjundaswamy et al. | |
| 2012/0103134 A1 | * | 5/2012 | Mafra | C22B 1/2406 75/228 |
| 2013/0330268 A1 | | 12/2013 | Suetsugu et al. | |

FOREIGN PATENT DOCUMENTS

| | | | |
|---|---|---|---|
| JP | 2002-348693 A | * | 12/2002 |
| JP | 2010251221 A | | 11/2010 |
| JP | 2011251862 A | | 12/2011 |
| KR | 100610596 B1 | | 8/2006 |

* cited by examiner

Compact Density as a Function of Second Milling Time
Second milling was conducted after neutralization and drying Compact Density as a Function of Second Milling Time
Second milling was conducted after the 1st milling step and before neutralization and drying.

Compact Density as a Function of Second Milling Time
Second milling was conducted between the neutralization step and the drying step

METHOD OF PRODUCING ELECTROLYTIC MANGANESE DIOXIDE WITH HIGH COMPACT DENSITY AND ELECTROLYTIC MANGANESE DIOXIDE PRODUCED THEREFROM

CROSS REFERENCE TO RELATED APPLICATION

This application claims priority to U.S. Provisional Application Ser. No. 61/981,942 filed on Apr. 21, 2014, the disclosure of which is hereby incorporated in its entirety by reference.

BACKGROUND OF THE INVENTION

Field of the Invention

The present invention relates to a method of producing electrolytic manganese dioxide and the electrolytic manganese dioxide produced therefrom, and more specifically, a method of double milling electrolytic manganese dioxide to modify the particle distribution in order to provide higher compact density.

Description of Related Art

Electrolytic manganese dioxide is commonly used as an active material for dry battery cells because it is an inexpensive and abundant material, and it provides excellent discharge and long-term storage performance. For example, electrolytic manganese dioxide is used as a material in the positive electrode of a primary alkaline battery. Electrolytic manganese dioxide is typically prepared by passing a direct current through a plating cell containing an acidic solution of manganese sulfate and sulfuric acid. The positive electrode of this plating cell may include a plate of titanium onto which the electrolytic manganese dioxide is deposited. The negative electrode may be made of graphite or copper or a similar material. The deposited electrolytic manganese dioxide is mechanically removed from the titanium plate after it has reached a thickness of about 1 mm to about 75 mm and may be crushed to a maximum dimension of 25-100 mm, resulting in electrolytic manganese dioxide pieces for further processing. Electrolytic manganese dioxide pieces are further reduced in size to meet the requirements of the battery manufacturer using a grinding or milling process.

Because the electrolytic manganese dioxide is prepared in an acidic bath, the preparation of the electrolytic manganese dioxide generally requires a washing and/or caustic treatment of the electrolytic manganese dioxide to neutralize the residual acidity of the bath. This treatment may be performed before or after the milling of the electrolytic manganese dioxide. If the neutralization step occurs after the milling step, then the electrolytic manganese dioxide particles are typically suspended in an aqueous solution to which sodium hydroxide is added followed by dewatering to separate the aqueous solution from the solid electrolytic manganese dioxide particles once the acidity has been neutralized. The resulting material after this neutralization step is referred to as neutralized electrolytic manganese dioxide.

In a final step, the electrolytic manganese dioxide is dried to certain specifications. For example, for primary alkaline-battery applications, the drying step is generally mild, leaving behind physisorbed water, which may range from about 1% to about 3% of the product weight. The resulting material is the active material for primary alkaline batteries.

Battery manufacturers use the electrolytic manganese dioxide as an active material of the positive electrode in alkaline cells against a zinc anode. The electrolytic manganese dioxide is combined with other materials that make up the positive-electrode precursor, which is compacted by tools. The quantity of electrolytic manganese dioxide packed in a battery of a predetermined volume is an important factor that determines battery performance. Electrolytic manganese dioxide compact density is a parameter used to predict the quantity of electrolytic manganese dioxide which can be packed into a battery. High compact density is preferred by battery manufacturers because a battery having a given volume will have better performance when the electrolytic manganese dioxide is more densely compacted.

SUMMARY OF THE INVENTION

The present invention is directed to a method for producing electrolytic manganese dioxide with high compact density. Electrolytic manganese dioxide pieces are milled in a classifying mill to produce first milled manganese dioxide particles having a first particle size distribution. The first milled manganese dioxide particles are then milled a second time to produce second milled manganese dioxide particles having a second particle size distribution.

The electrolytic manganese dioxide pieces may have a maximum dimension that is less than 100 mm.

In one aspect, the first milled electrolytic manganese dioxide particles may have a particle size distribution where less than 30% of the first milled manganese dioxide particles are larger than 200 mesh (74 µm) and up to 70% of the first milled manganese dioxide particles are smaller than 325 mesh (44 µm). In another aspect, the first milled electrolytic manganese dioxide particles may have a particle size distribution where less than 15% of the first milled manganese dioxide particles are larger than 200 mesh (74 µm) and up to 70% of the first milled manganese dioxide particles are smaller than 325 mesh (44 µm).

In one aspect, a minimum of 70% of the first milled electrolytic manganese dioxide particles are smaller than 200 mesh. In another aspect, a minimum of 85% of the first milled electrolytic manganese dioxide particles are smaller than 200 mesh. In one aspect, a maximum of 100% of the first milled electrolytic manganese dioxide particles are smaller than 200 mesh.

In one aspect, a minimum of 50% of the first milled electrolytic manganese dioxide particles are smaller than 325 mesh. In one aspect, a maximum of 95% of the first milled electrolytic manganese dioxide particles are smaller than 325 mesh. In another aspect, a maximum of 70% of the first milled electrolytic manganese dioxide particles are smaller than 325 mesh.

When the particle size distribution of the first milled manganese dioxide particles is plotted as a function of base-10 logarithm of the particle size, a first peak is centered at a particle size greater than 45 µm and contributes a minimum of 45% of the area under the curve of the overall particle size distribution. In another aspect, the first peak may be centered at a particle size greater than 55 µm.

When the particle size distribution of the second milled electrolytic manganese dioxide particles is plotted as a function of base-10 logarithm of the particle size, a first peak is centered at a particle size from 40-100 µm and contributes a minimum of 20% of the area under the curve of the overall particle size distribution. In another aspect, the first peak may contribute a minimum of 30% of the area under the curve of the overall particle size distribution. The first peak may contribute a maximum of 45% of the area under the curve of the overall particle size distribution. In another aspect, the first peak may contribute a maximum of 40% of the area under the curve of the overall particle size distribution.

A second peak may be centered at a particle size of 15-25 µm. A third peak may be centered at a particle size of 0.1-1 µm. The third peak may contribute a maximum of 20% of the area under the curve of the overall particle size distribution.

The second milling may be conducted for more than 2 minutes and less than 720 minutes.

The compact density of the second milled manganese dioxide particles may be at least 1% greater than a compact density of the first milled manganese dioxide particles.

The alkaline potential of neutralized particles of the second milled manganese dioxide particles may be no more than 20 mV less than an alkaline potential of neutralized particles of the first milled manganese dioxide particles.

The method may further comprise neutralizing and/or drying the first milled manganese dioxide particles before the second milling, neutralizing and/or drying the second milled manganese dioxide particles, or neutralizing the first milled manganese dioxide particles before the second milling and performing the second milling on neutralized, wet first-milled manganese dioxide particles and drying the second milled manganese dioxide particles.

The present invention is also directed to an electrolytic manganese dioxide particle composition. When the particle size distribution of the electrolytic manganese dioxide particle composition is plotted as a function of base-10 logarithm of the particle size, a first peak may be centered at a particle size from 40-100 µm and contribute a minimum of 20% of the area under the curve of the overall particle size distribution. In another aspect, the first peak may contribute a minimum of 30% of the area under the curve of the overall particle size distribution. The first peak may contribute a maximum of 45% of the area under the curve of the overall particle size distribution. In another aspect, the first peak may contribute a maximum of 40% of the area under the curve of the overall particle size distribution.

A second peak may be centered at a particle size of 15-25 µm. In another aspect, the second peak may be centered at a particle size of 15-20 µm. A third peak may be centered at a particle size of 0.1-1 µm. The third peak may contribute a maximum of 20% of the area under the curve of the overall particle size distribution.

The present invention is also directed to a method for producing electrolytic manganese dioxide with high compact density where manganese dioxide pieces are milled to produce first milled manganese dioxide particles. The first milled manganese dioxide particles are classified to produce classified manganese dioxide particles, wherein the classified manganese dioxide particles have a first particle size distribution. The classified manganese dioxide particles are milled to produce second milled manganese dioxide particles, wherein the second milled manganese dioxide particles have a second particle size distribution.

DESCRIPTION OF THE INVENTION

Figure 1:
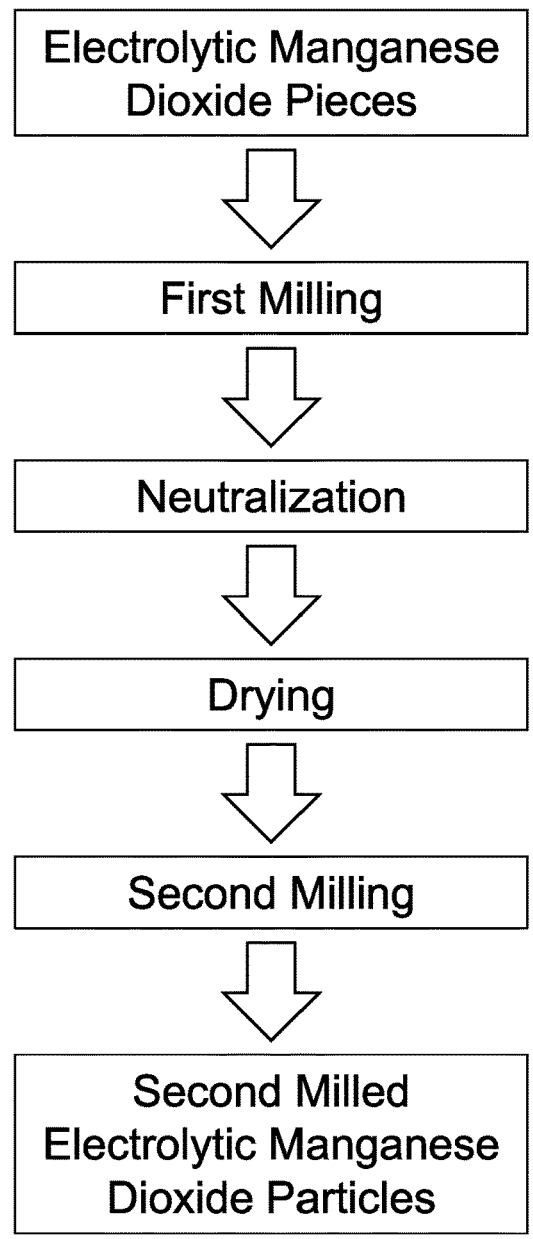
FIG. 1 is a flowchart of a method of producing electrolytic manganese dioxide according to one aspect of the present invention.

In a first aspect of the present invention as shown in FIG. 1, electrolytic manganese dioxide pieces are milled in a classifying mill. The manganese dioxide pieces may have a having a maximum dimension of less than 100 mm. A classifying mill is a mill that not only crushes and/or grinds the electrolytic manganese dioxide pieces but also classifies the resulting first milled electrolytic manganese dioxide particles to achieve a desired particle size. This first milling can be a wet or dry process and can be conducted using a ball mill, roller mill, Raymond mill, or any other suitable milling equipment having a classifier. During the milling, the electrolytic manganese dioxide pieces are ground into first milled electrolytic manganese dioxide particles, and the classifying portion of the mill is set to allow only first milled electrolytic manganese dioxide particles within a certain size range to exit the mill for use in the next process step.

In another aspect of the invention, a non-classifying mill may be used for the first milling and the classification of the first milled electrolytic manganese dioxide particles may be completed in a separate step. The classification may be completed using any suitable method including screening.

In one aspect, the first milled electrolytic manganese dioxide particles may have a particle size distribution where less than 30% of the first milled manganese dioxide particles are larger than 200 mesh (74 µm) and up to 95% of the first milled manganese dioxide particles are smaller than 325 mesh (44 µm). In another aspect, the first milled electrolytic manganese dioxide particles may have a particle size distribution where less than 15% of the first milled manganese dioxide particles are larger than 200 mesh and up to 70% of the first milled manganese dioxide particles are smaller than 325 mesh.

In one aspect, a minimum of 70% of the first milled electrolytic manganese dioxide particles are smaller than 200 mesh, i.e., pass through a 200 mesh screen. In another aspect, a minimum of 85% of the first milled electrolytic manganese dioxide particles are smaller than 200 mesh. In one aspect, a maximum of 100% of the first milled electrolytic manganese dioxide particles are smaller than 200 mesh.

In one aspect, a minimum of 50% of the first milled electrolytic manganese dioxide particles are smaller than 325 mesh. In one aspect, a maximum of 95% of the first milled electrolytic manganese dioxide particles are smaller than 325 mesh. In another aspect, a maximum of 70% of the first milled electrolytic manganese dioxide particles are smaller than 325 mesh.

The first milled electrolytic manganese dioxide particles are mixed with water to create a slurry. Any suitable base including, but not limited to, sodium hydroxide is added to the slurry to neutralize the electrolytic manganese dioxide particles. The slurry is dewatered and dried to remove most of the water (which may be referred to collectively hereinafter as "a drying step"), leaving about 1 to 3% physisorbed water by weight in the first milled electrolytic manganese dioxide particles. The dewatering may be performed by filtering and the drying may use hot air.

The first milled electrolytic manganese dioxide particles are then milled a second time. The second milling is conducted in a tumbling mill, for example, a ball mill, a jar mill, or a similar type of mill. The milling media can be balls, beads, cylinders, or rods made of a non-metallic compound including, but not limited to alumina or zirconia. The size of the milling media may be from about 5 mm to about 100 mm. The second milling is conducted for a minimum of 2 minutes, such as 10 minutes, 30 minutes, or 60 minutes or more. In one aspect, the second milling may be conducted for a maximum of 720 minutes. In another aspect, the second milling may be conducted for a maximum of 480 minutes or less.

Figure 2:
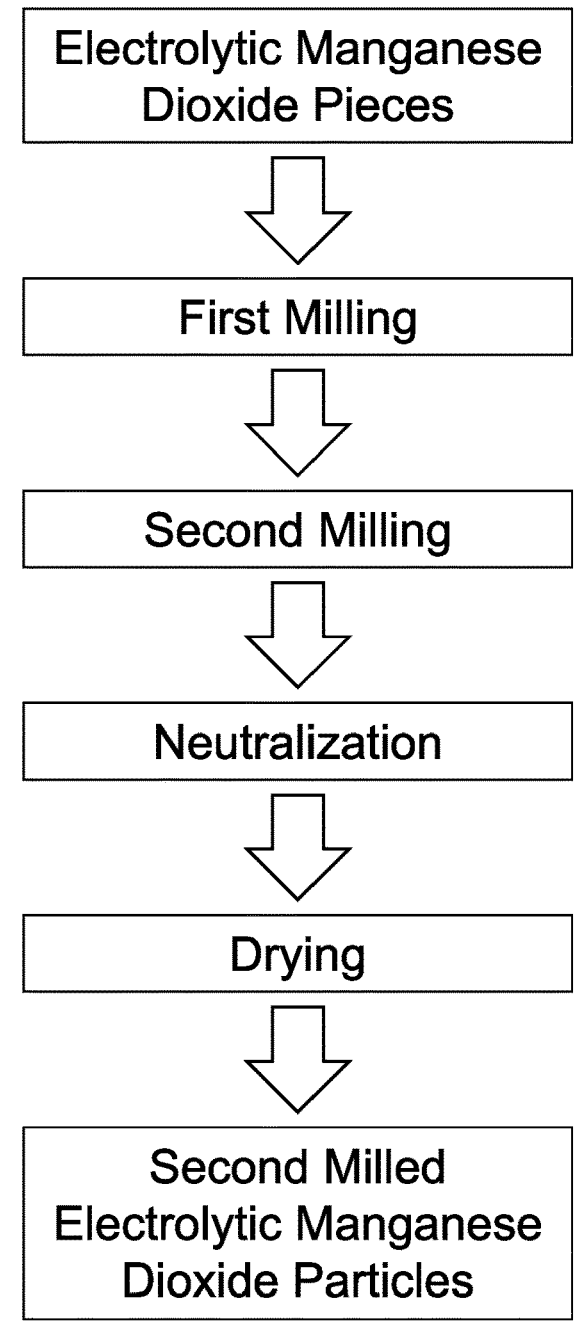
FIG. 2 is a flowchart of a method of producing electrolytic manganese dioxide according to one aspect of the present invention.

In another aspect, as shown in FIG. 2, the first milling and the second milling are dry processes, and neutralization and drying are performed on the second milled electrolytic manganese dioxide particles after both the first milling and the second milling have been completed instead of between the two millings.

Figure 3:
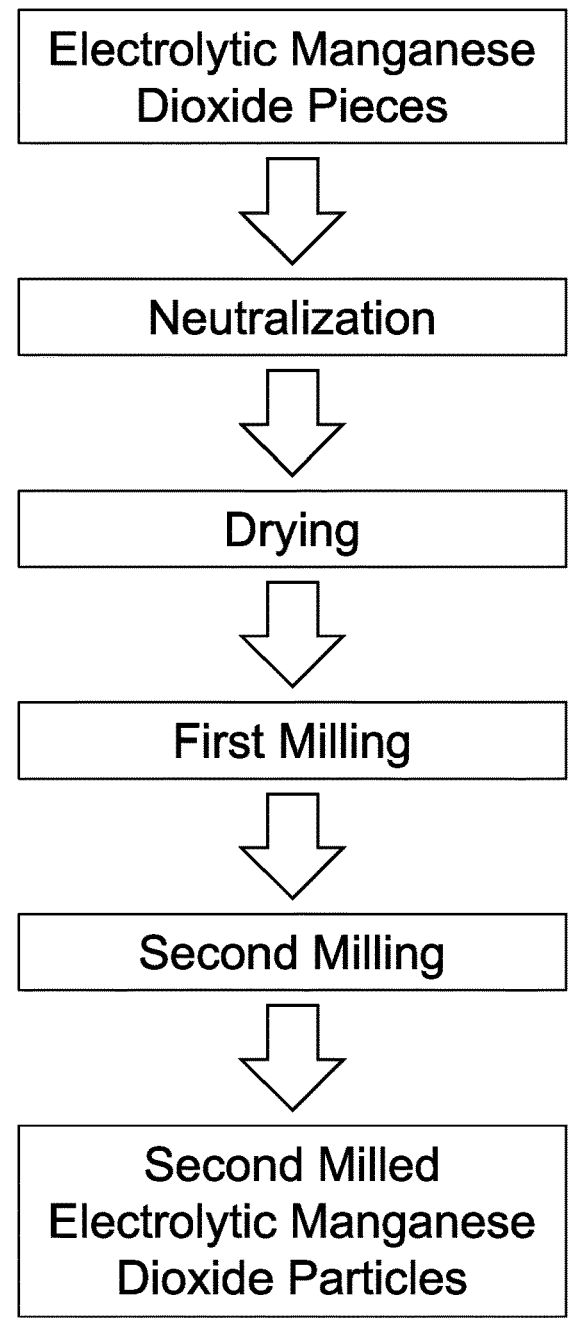
FIG. 3 is a flowchart of a method of producing electrolytic manganese dioxide according to one aspect of the present invention.

In another aspect, as shown in FIG. 3, the first milling and the second milling are dry processes, and neutralization and drying are performed on the electrolytic manganese dioxide pieces before the first milling instead of between the two millings.

Figure 4:
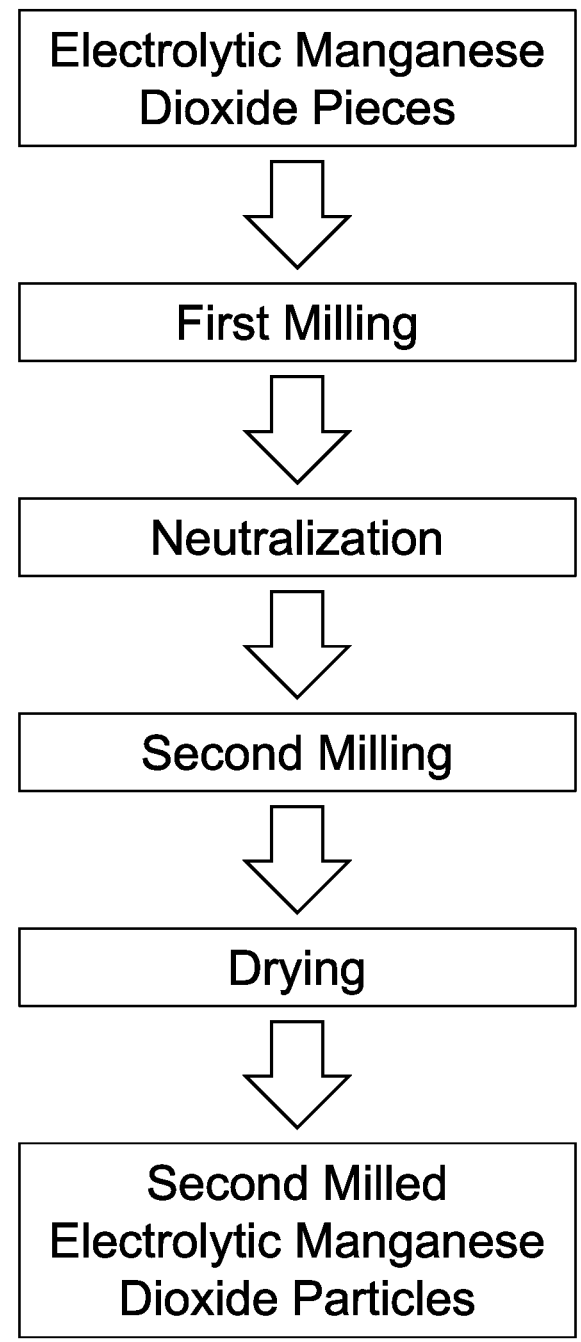
FIG. 4 is a flowchart of a method of producing electrolytic manganese dioxide according to one aspect of the present invention.

In another aspect, as shown in FIG. 4, the first milling is a dry process. The first milled electrolytic manganese dioxide particles are neutralized, and introduced wet into the second milling. Drying is performed on the second milled electrolytic manganese dioxide particles after the second milling.

Without being bound by theory, it is believed that the second milling modifies the particle size distribution in a way that allows, during compaction, for more effective filling of the void space between particles with a particle of the same size as the void space.

In one aspect of the invention, the compact density of the second milled manganese dioxide particles may be at least 1% greater than a compact density of the first milled manganese dioxide particles. In another aspect of the invention, the compact density of the second milled manganese dioxide particles may be at least 2% greater than a compact density of the first milled manganese dioxide particles. In further aspect of the invention, the compact density of the second milled manganese dioxide particles may be at least 3% greater than a compact density of the first milled manganese dioxide particles.

In one aspect of the invention, the alkaline potential of neutralized particles of the second milled manganese dioxide particles may be no more than 20 mV less than an alkaline potential of neutralized particles of the first milled manganese dioxide particles. In another aspect of the invention, the alkaline potential of neutralized particles of the second milled manganese dioxide particles may be no more than 10 mV less than an alkaline potential of neutralized particles of the first milled manganese dioxide particles. In a further, aspect of the invention, the alkaline potential of neutralized particles of the second milled manganese dioxide particles may be no more than 5 mV less than an alkaline potential of neutralized particles of the first milled manganese dioxide particles.

In general, the particle size distribution of electrolytic manganese dioxide particles can be described as an overlap of three Gaussian distributions, when the particle size distribution is plotted as a function of base-10 logarithm of the particle size. A first peak is centered at a particle size below 100 µm, a third peak is centered at a particle size in the range of 0.1-1.0 µm, and a second peak is located between the first peak and the third peak.

In the particle size distribution of the first milled electrolytic manganese dioxide particles, when plotted as a function of base-10 logarithm of the particle size, the first peak is centered at a particle size greater than 45 µm and contributes a minimum of 45% of the area under the curve of the overall particle size distribution. In another aspect, the first peak may be centered at a particle size greater than 55 µm.

In the particle size distribution of the second milled electrolytic manganese dioxide particles, when plotted as a function of base-10 logarithm of the particle size, the first peak is centered at a particle size from 40-100 µm and contributes a minimum of 20% of the area under the curve of the overall particle size distribution. In another aspect, the first peak may contribute a minimum of 30% of the area under the curve of the overall particle size distribution. The first peak contributes a maximum of 45% of the area under the curve of the overall particle size distribution. In another aspect, the first peak may contribute a maximum of 40% of the area under the curve of the overall particle size distribution.

A second peak may be centered at a particle size of 15-25 µm. In another aspect, the second peak may be centered at a particle size of 15-20 µm. The third peak may be centered at a particle size of 0.1-1 µm. The third peak may contribute a maximum of 20% of the area under the curve of the overall particle size distribution.

The following examples are presented to demonstrate the general principles of the invention. The invention should not be considered as limited to the specific examples presented.

EXAMPLES

The following examples were tested for particle size distribution, compact density and alkaline potential as described below Measurement of Particle Size Distribution The particle size distribution was measured by laser diffraction using a MicroTrac 3500. The flow rate was set to 60%, the transparency was set to absorbing, particle shape was set to irregular, and a fluid refractive index of 1.333 was used. The milled electrolytic manganese dioxide particles were introduced into the water-containing chamber of the instrument until the software determines that the loading factor was in the correct range. Then the milled electrolytic manganese dioxide particles inside the chamber were exposed to ultrasound at 25 mW for 60 seconds. Diffraction data was taken twice for 60 seconds with a 1 minute delay between the measurements. The average data was presented in a Geom8 Root progression with a lower edge of 0.0215 µm and an upper edge of 704 µm. As a result, 120 data points were collected. The volume percentage, $f_j$, of the milled electrolytic manganese dioxide particles having the size, d, of channel j, was determined.

When plotting the data of $f_j$ as a function of size (on a logarithmic scale), two apparent peaks were observed, one centered about 55 µm and one centered about 0.4 µm.

However, when fitting the observed particle distribution three overlapping Gaussian peaks, $g_i(x)$, were used such that the particle size distribution is fit with the following function:

$$g_i(x) = A_i \frac{1}{\sqrt{2\pi}} \frac{1}{\sigma_i} \exp\left\{-\frac{(\log_{10}(x) - \log_{10}(x_i))^2}{2\sigma_i^2}\right\},$$

where $A_i$ is the size of the peak at position $x_i$ with a width of $\sigma_i$ (i=1, 2, 3). The sum of these individual peaks is $$g(x) = \Sigma_{i=1}^{3} g_i(x).$$

The fit itself was executed using the Solver tool of Microsoft Excel using the GRG non-linear method and the constraints $0.05 \leq x_3 \leq 1$, $1 \leq x_2 \leq x_1$, and $x_1 \leq 100$ in order to minimize $$\Delta = \sum_{j=1}^{N} (f_j - g(d_j/\mu m))^2,$$

where N is the number of data points of the particle size distribution (i.e. 120) and $d_j$ is the size of the particles in channel j.

For the three peaks, $A_i$ is the area under the curve of peak i and the sum, A, of $A_1+A_2+A_3$ is the total area under the curve of the overall particle size distribution. The relative area under the curve contributed by each peak i is $a_i = A_i/A$.

Measurement of Compact Density

An apparatus comprising two cans, a plunger, a pelletizer die, and a canning die was used. Two circular pieces of weighing paper whose diameter was slightly smaller than the can diameter were cut. One circular piece of weighing paper was placed into each of the two cans. One can was labeled with a "0", and the other can was labeled with a "1". The can/paper combination labeled "1" was weighed and the weight was recorded as "Weight Can 1/Paper".

The can/paper combination labeled "0" was placed into the canning die. The plunger was inserted into the can, and the can/paper were compressed at 1000 lb. force for 5 seconds using a Carver Press. The pressure was released, five seconds was allowed to pass, and the process was repeated.

A 700 mg of sample (+/−50 mg) was placed into the pelletizing die and compressed at 1000 lb. force for 5 seconds.

The paper was removed from the can/paper combination labeled "1", and the can was placed in the canning die. The compressed pellet was transferred from the pelletizer die to the canning die so that it fits into the can. The paper was placed on top of the can/pellet and the plunger was inserted.

The can/pellet/paper was compressed at 1000 lb. for 1 minute. The pressure was released, five seconds was allowed to pass, and the process was repeated. The can/pellet/paper were removed from the die.

The can/paper labeled "0" were used to zero a digital micrometer. The pellet height of the can "1"/paper/pellet combination was measured with the digital micrometer and recorded as the "Micrometer Height". The can "1"/paper/pellet combination was weighed on a Microbalance, and the weight was recorded as "Weight Can 1/Paper/Pellet".

The individual compact density was calculated as $$\text{Individual Compact Density} = \frac{\text{"Weight Can 1/Paper/Pellet"} - \text{"Weight Can 1/Paper"}}{\text{"Micrometer Height"} \times (\text{"Can Diameter"})^2 \times \pi/4}$$

The Individual Compact Density of each sample was measured 25 times, and the average of the 25 values was reported the Compact Density of the sample.

Measurement of Alkaline Potential

The alkaline potential of the milled electrolytic manganese dioxide particles was determined by placing 350±50 mg of milled electrolytic manganese dioxide particles into a small nickel-coated can with an inner diameter of about 0.435 inches and a height of about 0.19 inches. 100 µl of 45% KOH solution was pipetted into the can as electrolyte, then two paper disks were placed on top of the particle-electrolyte mixture and the content of the can was tapped down with a stainless steel rod. The same preparation was repeated two more times to create a total of three samples. The three cans were covered to minimize evaporation and set aside for 30-120 minutes to allow for proper wetting of the milled electrolytic manganese dioxide particles. Finally, the cans were placed on a metal mesh. The positive electrode of a voltmeter was connected to the metal mesh and the negative electrode was connected to a Hg/HgO reference electrode (commercially available from Koslow Scientific Company filled with 45% KOH solution). The tip of the reference electrode was placed on top of the paper inside the cans and the voltage measured by the voltmeter was recorded. The values for the three cans were averaged and referred to as a single value of alkaline potential, Φ.

Comparative Example 1

Electrolytic manganese dioxide pieces with a maximum dimension of less than 100 mm were fed into a 6-roll Raymond mill. The mill was controlled so that 89.2% of the resulting first milled electrolytic manganese dioxide particles smaller than 200 mesh and 61.4% of the resulting first milled electrolytic manganese dioxide particles were smaller than 325 mesh. The first milled electrolytic manganese dioxide particles were neutralized and dried. The compact density of the neutralized and dried first milled electrolytic manganese dioxide particles was measured and is shown in Table 1.

Examples 1-6

Figure 5:
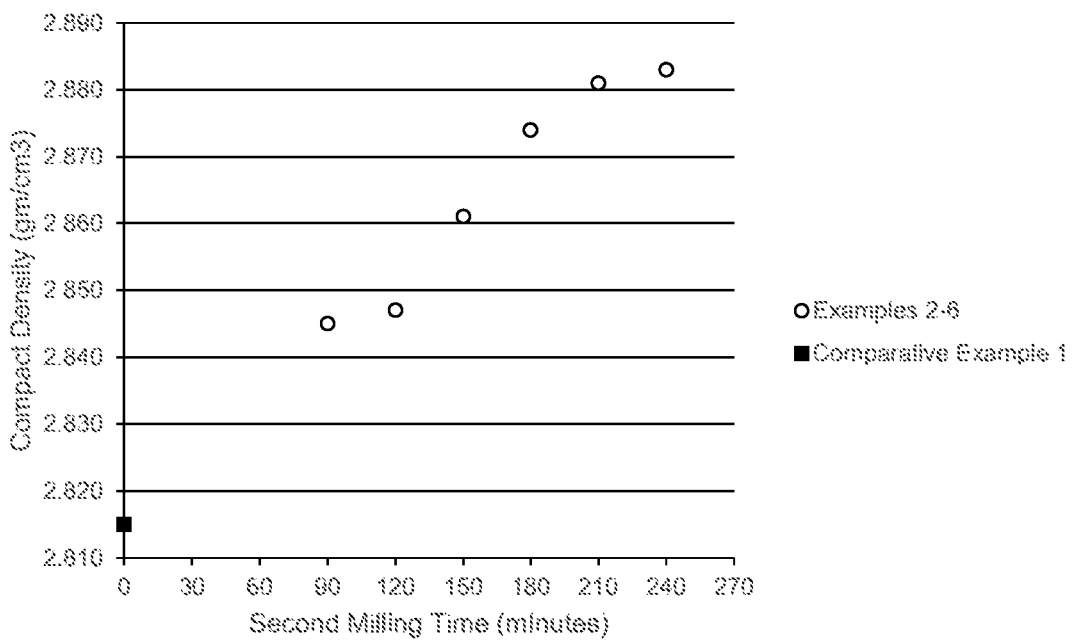
FIG. 5 is a graph showing compact density as a function of milling time when the second milling is conducted after neutralization and drying.

The neutralized and dried first milled electrolytic manganese dioxide particles prepared in Comparative Example 1 were fed into a jar mill for the second milling. The internal diameter of the jar was 4.8 inches and the internal height of the jar was 3.75 inches. The volume of the jar was 68 cubic inches. The milling media was 12 mm Zirconia balls that occupied about 50% of the volume of the jar. The electrolytic manganese dioxide particles filled about 25% of the volume of the jar and weighed 400 grams. The cylindrical jar was placed on the rollers of the mill, and the rotation speed was set at 21 revolutions per minute. Second milled electrolytic manganese dioxide particles were prepared in this manner using second milling times of 240, 210, 180, 150, 120, and 90 minutes. The compact density of the second milled electrolytic manganese dioxide particles was measured and is shown in Table 1 along with the compact density as a percent increase over the compact density of Comparative Example 1. The effect of the second milling time on compact density is shown in FIG. 5.

TABLE 1

Compact density as a function of milling time when the second milling was conducted after neutralization and drying.

|  | Time of Second Milling (minutes) | Compact Density (g/cm³) | Change in Compact Density (%) |
| --- | --- | --- | --- |
| Comparative Example 1 | 0 | 2.815 |  |
| Example 1 | 240 | 2.883 | 2.4 |
| Example 2 | 210 | 2.881 | 2.3 |
| Example 3 | 180 | 2.874 | 2.1 |
| Example 4 | 150 | 2.861 | 1.6 |
| Example 5 | 120 | 2.847 | 1.1 |
| Example 6 | 90 | 2.845 | 1.1 |

Comparative Example 2

Electrolytic manganese dioxide pieces with a size of less than 100 mm were fed into a 6-roll Raymond mill. The mill was controlled so that 90% of the resulting first milled electrolytic manganese dioxide particles were smaller than 200 mesh and 60% of the resulting first milled electrolytic manganese dioxide particles were smaller than 325 mesh. The first milled electrolytic manganese dioxide particles were neutralized and dried. The compact density of the neutralized and dried first milled electrolytic manganese dioxide particles was measured and is shown in Table 2.

Examples 7-11

Figure 6:
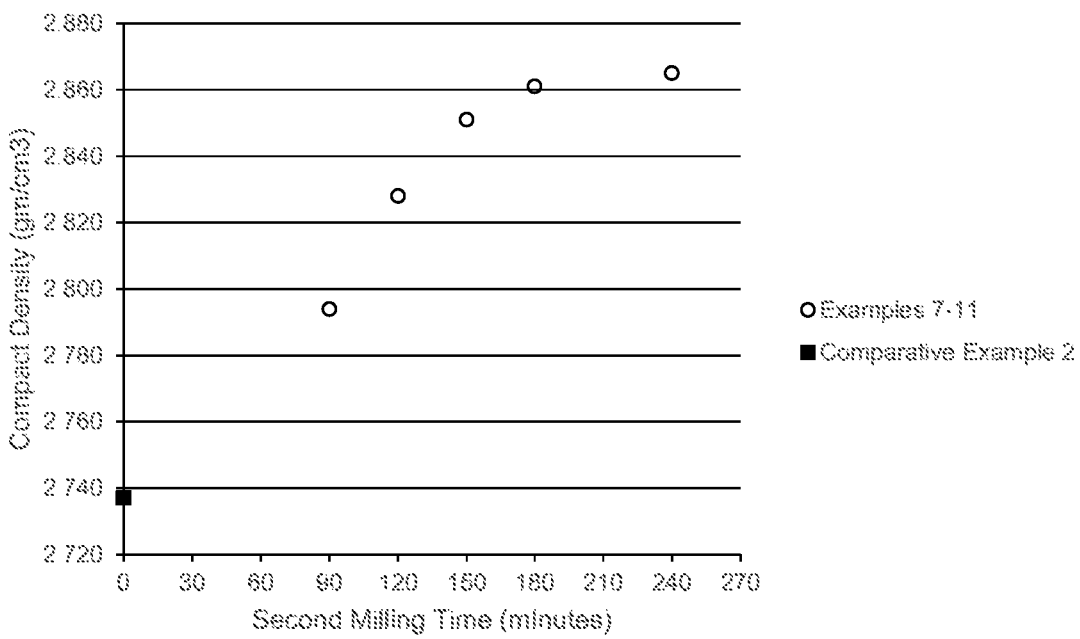
FIG. 6 is a graph showing compact density as a function of milling time when the second milling is conducted after the first milling step and before neutralization and drying.

First milled electrolytic manganese dioxide particles prepared in Comparative Example 2 prior to neutralization and drying were fed into a jar mill for the second milling. The internal diameter of the jar was 4.8 inches and the internal height of the jar was 3.75 inches. The volume of the jar was 68 cubic inches. The milling media was 12 mm Zirconia balls that occupied about 50% of the volume of the jar. The electrolytic manganese dioxide particles filled about 25% of the volume of the jar and weighed 400 grams. The cylindrical jar was placed on the rollers of the mill, and the rotation speed was set at 21 revolutions per minute. Second milled electrolytic manganese dioxide particles were prepared in this manner using second milling times of 240, 180, 150, 120, and 90 minutes. The second milled electrolytic manganese dioxide particles were then neutralized and dried. The compact density of the second milled electrolytic manganese dioxide particles was measured and is shown in Table 2 along with the compact density as a percent increase over the compact density of Comparative Example 2. The effect of the second milling time on compact density is shown in FIG. 6.

TABLE 2

Compact density as a function of milling time when the second milling was conducted after the first milling step and before neutralization and drying.

|  | Time of Second Milling (minutes) | Compact Density (g/cm³) | Change in Compact Density (%) |
| --- | --- | --- | --- |
| Comparative Example 2 | 0 | 2.737 |  |
| Example 7 | 240 | 2.865 | 4.7 |
| Example 8 | 180 | 2.861 | 4.5 |

TABLE 2-continued

Compact density as a function of milling time when the second milling was conducted after the first milling step and before neutralization and drying.

|  | Time of Second Milling (minutes) | Compact Density (g/cm³) | Change in Compact Density (%) |
| --- | --- | --- | --- |
| Example 9 | 150 | 2.851 | 4.2 |
| Example 10 | 120 | 2.828 | 3.3 |
| Example 11 | 90 | 2.794 | 2.1 |

Comparative Example 3

Electrolytic manganese dioxide pieces with a size of less than 100 mm were fed into a 6-roll Raymond mill. The mill was controlled so that 90% of the resulting first milled electrolytic manganese dioxide particles were smaller than 200 mesh and 60% of the resulting first milled electrolytic manganese dioxide particles were smaller than 325 mesh. The first milled electrolytic manganese dioxide particles were neutralized and dried. The compact density of the neutralized and dried first milled electrolytic manganese dioxide particles was measured and is shown in Table 4. In addition, the particle size distribution was determined and the results are given in Tables 3 and 4.

Examples 12-14

Figure 7:
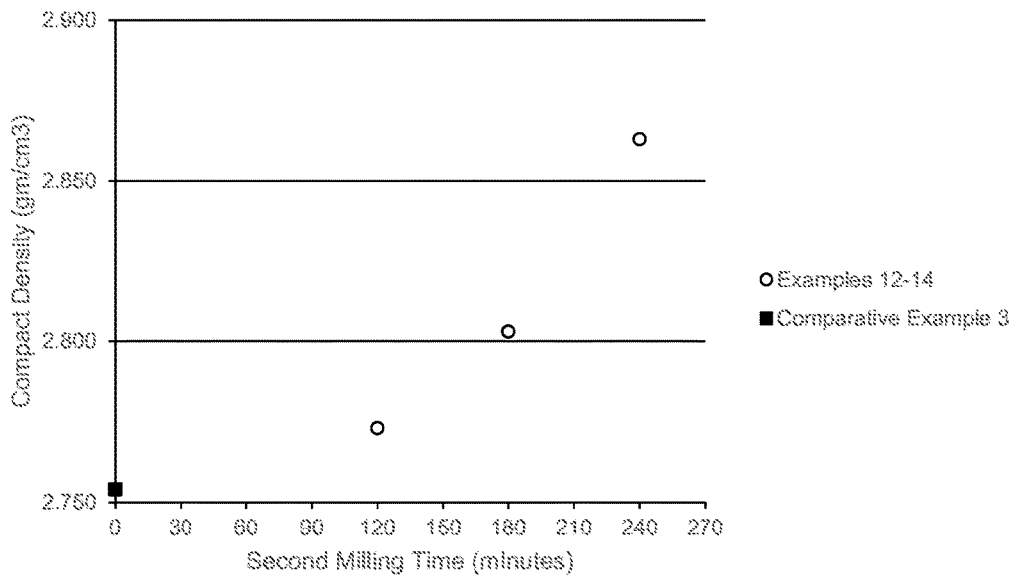
FIG. 7 is a graph showing compact density as a function of milling time when the second milling is conducted between the neutralization step and the drying step.
Figure 8:
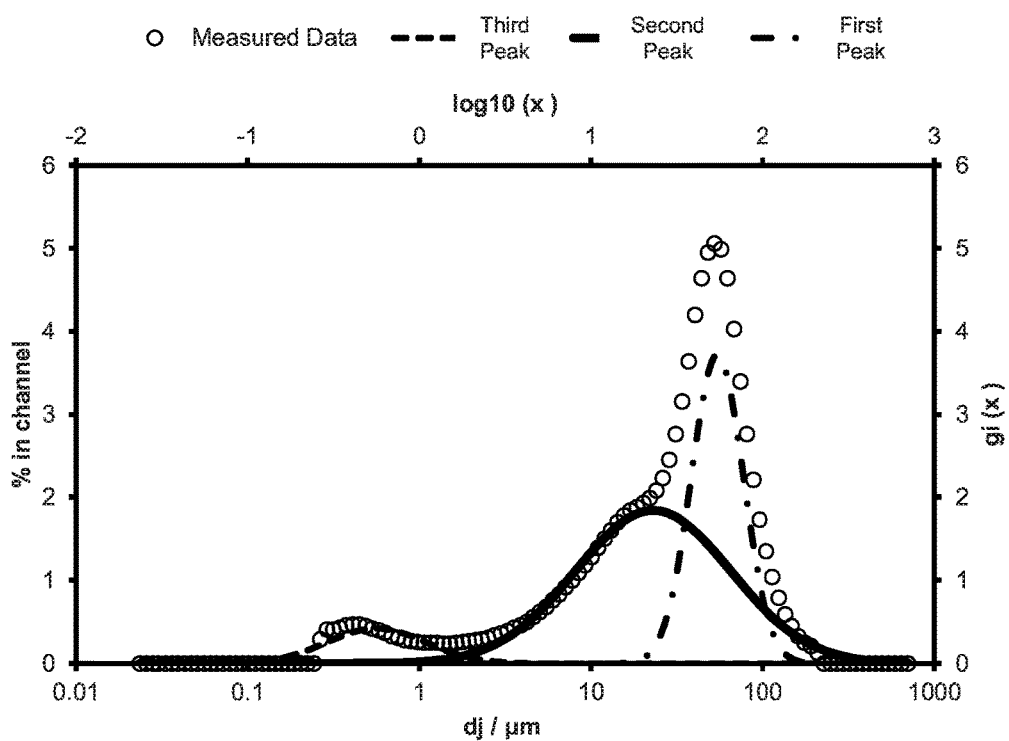
FIG. 8 is a graph showing the particle size distribution for the second milled electrolytic manganese dioxide produced in inventive Example 12.

Neutralized but not dried first milled electrolytic manganese dioxide particles prepared in Comparative Example 3 were filtered to obtain a wet cake of neutralized electrolytic manganese dioxide with 16% moisture. The wet cake was fed into a jar mill for the second milling. The internal diameter of the jar was 4.8 inches and the internal height of the jar was 3.75 inches. The volume of the jar was 68 cubic inches. The milling media was 12 mm Zirconia balls that occupied about 50% of the volume of the jar. The wet cake of neutralized electrolytic manganese dioxide particles filled about 25% of the volume of the jar and weighed 475 gram. 40 ml of distilled water was added to the jar. The cylindrical jar was placed on the rollers of the mill, and the rotation speed was set at 21 revolutions per minute. Second milled electrolytic manganese dioxide particles were prepared in this manner using second milling times of 240, 180, and 120 minutes. The second milled electrolytic manganese dioxide particles were then dried. The compact density of the second milled electrolytic manganese dioxide particles was measured and is shown in Table 4 along with the compact density as a percent increase over the compact density of Comparative Example 3. The effect of the second milling time on compact density is shown in FIG. 7. In addition, the particle size distribution was determined and the results are given in Tables 3 and 4. The particle size distribution for Example 12 is also shown graphically in FIG. 8.

TABLE 3

Particle size distribution results for examples where the second milling was conducted between the neutralization step and the drying step.

|  | i | First Peak 1 | Second Peak 2 | Third Peak 3 |
| --- | --- | --- | --- | --- |
| Comparative Example 3 | $A_i$ | 1.87 | 1.62 | 0.30 |
|  | $x_i$ | 59 | 26 | 1.0 |
|  | $\sigma_i$ | 0.17 | 0.42 | 0.48 |
|  | $a_i = A_i/(A_1 + A_2 + A_3) \times 100\%$ | 49% | 43% | 8% |

11

TABLE 3-continued

Particle size distribution results for examples where the second milling was conducted between the neutralization step and the drying step.

| | i | First Peak 1 | Second Peak 2 | Third Peak 3 |
|---|---|---|---|---|
| Example 12 | $A_i$ | 1.34 | 2.04 | 0.41 |
| | $x_i$ | 42 | 17 | 0.5 |
| | $\sigma_i$ | 0.15 | 0.48 | 0.24 |
| | $a_i = A_i/(A_1 + A_2 + A_3) \times 100\%$ | 35% | 54% | 11% |
| Example 13 | $A_i$ | 1.29 | 2.13 | 0.37 |
| | $x_i$ | 49 | 20 | 0.5 |
| | $\sigma_i$ | 0.15 | 0.46 | 0.25 |
| | $a_i = A_i/(A_1 + A_2 + A_3) \times 100\%$ | 34% | 56% | 10% |
| Example 14 | $A_i$ | 1.41 | 2.08 | 0.30 |
| | $x_i$ | 54 | 23 | 0.6 |
| | $\sigma_i$ | 0.15 | 0.45 | 0.29 |
| | $a_i = A_i/(A_1 + A_2 + A_3) \times 100\%$ | 37% | 55% | 8% |

TABLE 4

Results for examples where the second milling was conducted between the neutralization and the drying.

| | Time in Second Milling (minutes) | Compact Density (g/cm³) | Change in Compact Density (%) | First Peak (% of area) | Third Peak (% of area) | Center of First Peak (μm) | Center of Second Peak (μm) |
|---|---|---|---|---|---|---|---|
| Comparative Example 3 | 0 | 2.754 | | 49% | 8% | 59 | 26 |
| Example 12 | 240 | 2.863 | 4.0 | 35% | 11% | 42 | 17 |
| Example 13 | 180 | 2.803 | 1.8 | 34% | 10% | 49 | 20 |
| Example 14 | 120 | 2.773 | 0.7 | 37% | 8% | 54 | 23 |

Comparative Example 4

Similar to Comparative Example 1, electrolytic manganese dioxide was prepared by a first milling step, a neutralization step, and a drying step. The particle size distribution of the first milled electrolytic manganese dioxide particles was then analyzed. Results are shown in Table 5. In addition, the alkaline potential $\Phi_0$ of the first milled electrolytic manganese dioxide particles was determined and the results are shown in Table 5.

Comparative Example 5

The first milled electrolytic manganese dioxide particles of Comparative Example 4 were subjected to a second milling, similar to the one described in Example 1. The second milling was conducted for about 2 minutes. About 5-10 g of second milled electrolytic manganese dioxide particles were removed from the jar to determine the particle size distribution and the alkaline potential $\Phi_2$. Table 2 shows the difference in alkaline potential between this Comparative Example 4 and Comparative Example 4, i.e. $\Delta\Phi=\Phi_2-\Phi_0$. After 2 minutes of secondary milling, the particle size distribution and the alkaline potential of the second milled electrolytic manganese dioxide particles are not substantially different from the first milled electrolytic manganese dioxide particles.

Example 15

The second milling of Comparative Example 5 was continued for another 58 minutes for a total of about 60 minutes. About 5-10 g of electrolytic manganese dioxide

12 was removed from the jar to determine the particle size distribution. The alkaline potential was also determined and compared to the alkaline potential of Comparative Example 4. The results are shown in Table 5. While the particle size distribution changed, no change in the alkaline potential was observed.

Example 16

The second milling of Comparative Example 5 was continued for another 30 minutes for a total of about 90 minutes. About 5-10 g of electrolytic manganese dioxide was removed from the jar to determine the particle size distribution. The alkaline potential was also determined and compared to the alkaline potential of Comparative Example 4. The results are shown in Table 5. Again, while the particle size distribution changed, no change in the alkaline potential was observed.

Example 17

The second milling of Comparative Example 5 was continued for another 30 minutes for a total of about 120 minutes. About 5-10 g of electrolytic manganese dioxide was removed from the jar to determine the particle size distribution. The alkaline potential was also determined and compared to the alkaline potential of Comparative Example 4. The results are shown in Table 5. Again, while the particle size distribution changed, no change in the alkaline potential was observed.

Example 18

The second milling of Comparative Example 5 was continued for another 120 minutes for a total of about 240 minutes. About 5-10 g of electrolytic manganese dioxide was removed from the jar to determine the particle size distribution. The alkaline potential was also determined and compared to the alkaline potential of Comparative Example 4. The results are shown in Table 5. While the particle size distribution changed, only a small change in the alkaline potential was observed.

Example 19

The second milling of Comparative Example 5 was continued for another 240 minutes for a total of about 480 minutes. About 5-10 g of electrolytic manganese dioxide was removed from the jar to determine the particle size distribution. The alkaline potential was also determined and compared to the alkaline potential of Comparative Example 4. Again, while the particle size distribution changed, only a small change in the alkaline potential was observed.

Example 20

The first milled electrolytic manganese dioxide particles of Comparative Example 4 were subjected to a second milling, similar to the one described in Example 1. The second milling was conducted for about 720 minutes. Then, the particle size distribution was measured. The alkaline potential was also determined and compared to the alkaline potential of Comparative Example 4. The results are shown in Table 5. With the additional milling, the amount of material with a size of less than 1 μm was increased as indicated by the percentage of area under the curve of the overall particle size distribution contributed by the third peak which is centered around a particle size of 0.1-1 μm.

Example 21

The second milling step of Example 19 was continued for another 960 minutes for a total of 1440 minutes. Then, the particle size distribution was measured. The alkaline potential was also determined and compared to the alkaline potential of Comparative Example 4. The results are shown in Table 5. With the additional milling, the amount of material with a size of less than 1 μm was increased as indicated by the percentage of area under the curve of the overall particle size distribution contributed by the third peak which is centered around a particle size of 0.1-1 μm.

TABLE 5

Particle size evolution and alkaline potential where the second milling was conducted after neutralization and drying

| | Time in Second Milling (minutes) | First Peak (% of area) | Third Peak (% of area) | Center of First Peak (μm) | Center of Second Peak (μm) | ΔΦ ($\Phi_{sample} - \Phi_0$) (mV) |
|---|---|---|---|---|---|---|
| Comparative Example 4 | 0 | 52% | 8% | 64 | 29 | |
| Comparative Example 5 | 2 | 52% | 8% | 63 | 29 | 0 |
| Example 15 | 60 | 42% | 13% | 58 | 27 | 0 |
| Example 16 | 90 | 42% | 13% | 55 | 26 | 0 |
| Example 17 | 120 | 41% | 14% | 53 | 24 | 0 |
| Example 18 | 240 | 37% | 19% | 47 | 20 | −3 |
| Example 19 | 480 | 30% | 27% | 39 | 14 | −4 |
| Example 20 | 720 | 27% | 29% | 36 | 10 | −10 |
| Example 21 | 1440 | 26% | 32% | 28 | 8 | −17 |

Whereas particular aspects of this invention have been described above for purposes of illustration, it will be evident to those skilled in the art that numerous variations of the details of the present invention may be made without departing from the invention as defined in the appended claims.

The invention claimed is:

1. A method for producing electrolytic manganese dioxide comprising:
   milling electrolytic manganese dioxide pieces in a classifying mill to produce first milled manganese dioxide particles, such that the first milled manganese dioxide particles have a particle size distribution where less than 30% of the first milled manganese dioxide particles are larger than 200 mesh and up to 95% of the first milled manganese dioxide particles are smaller than 325 mesh; and
   milling the first milled manganese dioxide particles to produce second milled manganese dioxide particles, wherein the second milled manganese dioxide particles have a second particle size distribution and wherein an alkaline potential of neutralized particles of the second milled manganese dioxide is no more than 20 mV less than an alkaline potential of neutralized particles of the first milled manganese dioxide.

2. The method of claim 1, wherein 50-95% of the first milled manganese dioxide particles are smaller than 325 mesh.

3. The method of claim 1, wherein less than 15% of the first milled manganese dioxide particles are larger than 200 mesh and up to 70% of the first milled manganese dioxide particles are smaller than 325 mesh.

4. The method of claim 3, wherein 85-95% of the first milled manganese dioxide particles are smaller than 200 mesh and 50-70% of the first milled manganese dioxide particles are smaller than 325 mesh.

5. The method of claim 1, wherein when particle size distribution of the first milled manganese dioxide particles is plotted as a function of base-10 logarithm of the particle size, the particle size distribution comprises a peak centered at a particle size greater than 45 μm that contributes at least 45% to the area under the curve of the overall particle size distribution.

6. The method of claim 5, wherein the first peak is centered at a particle size greater than 55 μm and contributes at least 45% to the area under the curve of the overall particle size distribution.

7. The method of claim 1, wherein the second milling is conducted for more than 2 minutes.

8. The method of claim 1, wherein the second milling is conducted for less than 720 minutes.

9. The method of claim 1, wherein when the second particle size distribution is plotted as a function of base-10 logarithm of the particle size, the particle size distribution comprises a first peak centered at a particle size from 40-100 μm, which contributes from 20% to 45% of the area under the curve of the overall particle size distribution.

10. The method of claim 1, wherein a compact density of the second milled manganese dioxide particles is at least 1% greater than a compact density of the first milled manganese dioxide particles.

11. The method of claim 1, further comprising neutralizing and/or drying the first milled manganese dioxide particles before the second milling.

12. The method of claim 1, further comprising neutralizing and/or drying the second milled manganese dioxide particles.

13. The method of claim 1, further comprising neutralizing the first milled manganese dioxide particles before the second milling and performing the second milling on neutralized, wet first-milled manganese dioxide particles.

14. The method of claim 13, further comprising drying the second milled manganese dioxide particles.

15. The method of claim 1, wherein a compact density of the second milled manganese dioxide particles is greater than a compact density of the first milled manganese dioxide particles.

16. A method for producing electrolytic manganese dioxide comprising:
   milling manganese dioxide pieces to produce first milled manganese dioxide particles;
   classifying the first milled manganese dioxide particles to produce classified manganese dioxide particles, wherein the classified manganese dioxide particles have a first particle size distribution; and milling the classified manganese dioxide particles to produce second milled manganese dioxide particles, wherein the second milled manganese dioxide particles have a second particle size distribution and wherein an alkaline potential of neutralized particles of the second milled manganese dioxide is no more than 20 mV less than an alkaline potential of neutralized particles of the first milled manganese dioxide.

17. An electrolytic manganese dioxide particle composition having a particle size distribution, wherein when the particle size distribution is plotted as a function of base-10 logarithm of the particle size, the particle size distribution comprises a first peak centered at a particle size of 40-100 μm and contributing 20-45 volume % to the area under the curve of the overall particle size distribution, a second peak centered at a particle size of 15-25 μm, and a third peak centered at a particle size of 0.1-1.0 μm and having a contribution of 1-20 volume % to the area under the curve of the overall particle size distribution.

18. The electrolytic manganese dioxide particle composition of claim 17, wherein the first peak contributes 30-40 volume % to the area under the curve of the overall particle size distribution.

19. The electrolytic manganese dioxide particle composition of claim 17, wherein the third peak contributes 8-20 volume % to the area under the curve of the overall particle size distribution.

\* \* \* \* \*